Dec. 23, 1941.   C. E. BOYD   2,267,073
ORTHODONTIC APPLIANCE
Filed Nov. 8, 1938
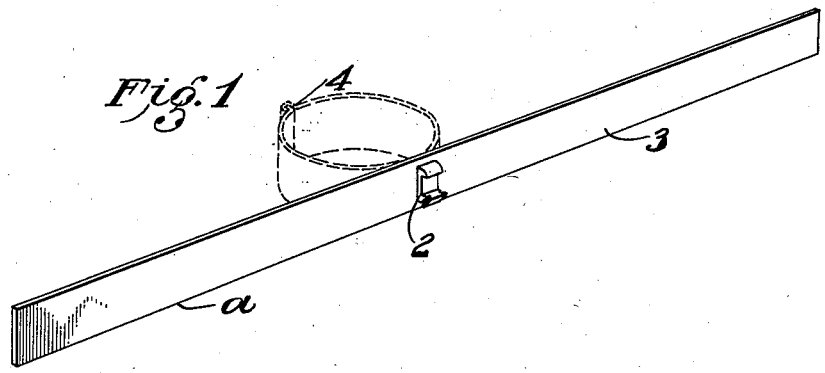
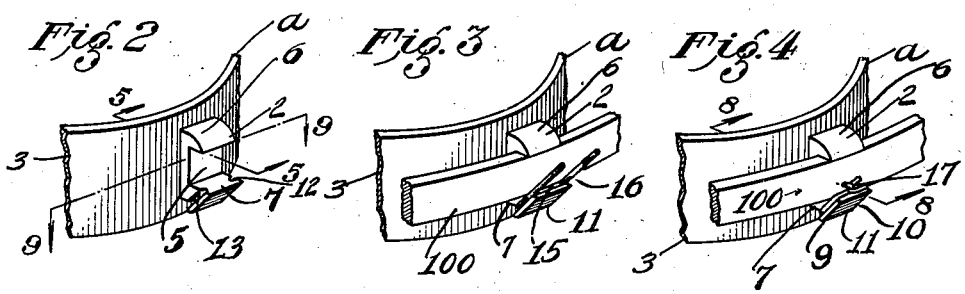
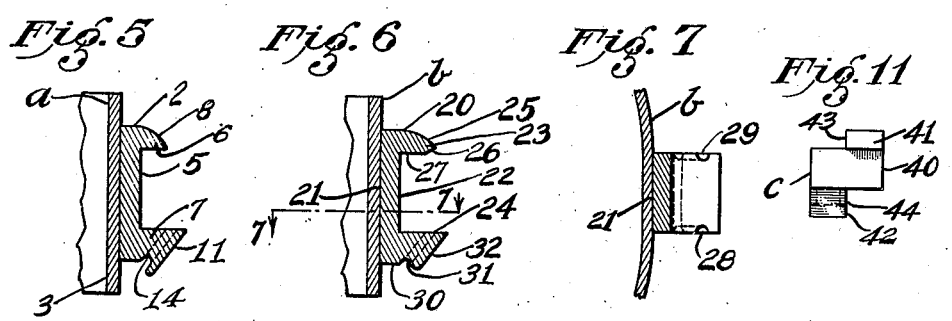
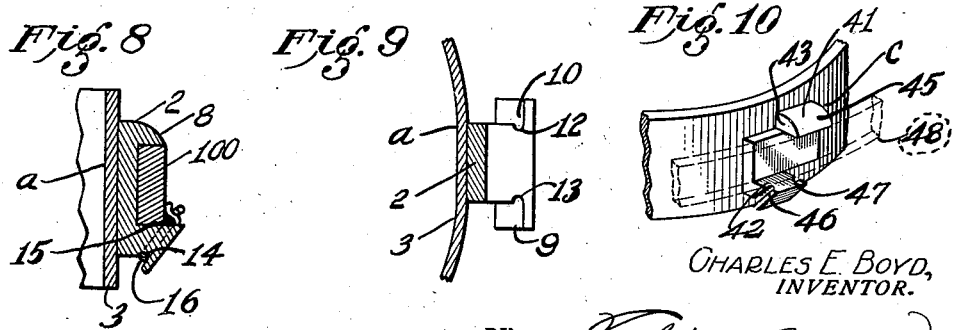
CHARLES E. BOYD,
INVENTOR.
BY *Calvin Brown*
ATTORNEY Patented Dec. 23, 1941

2,267,073

UNITED STATES PATENT OFFICE 2,267,073

ORTHODONTIC APPLIANCE

Charles Edward Boyd, Los Angeles, Calif.

Application November 8, 1938, Serial No. 239,503

7 Claims. (Cl. 32—14)

This invention relates to orthodontic appliances.

An object of the invention is the provision of an orthodontic appliance which is adapted to positively control tooth movement.

At the present time, orthodontists utilize several different devices and systems of application of said devices to the teeth for the purpose of moving teeth from malpose to normal positions. Some of these devices are bulky, with the result that the mucous membrane of the mouth is lacerated, causing sores. The present invention has for an object an orthodontic device in which bulk is reduced and in which the bracket is so constructed as to not lacerate the mouth.

Another object is the provision of an orthodontic band bracket which is capable of performing several operations upon a tooth at the same time, to wit: rotation plus movement labially, lingually, or transversely, and without loss of power or control.

Another object is the provision of an orthodontic appliance which is so constructed and arranged that any movement of the tooth desired, such as moving the crown, the root, body, producing elongation, depression, or any one of the several combinations, may be accomplished with ease and under perfect control.

Another object is the provision of an orthodontic appliance capable of producing even and greater physiological force, wherein fewer adjustments are necessary in the treatment of cases, with consequent less discomfiture to the patient as the control of forces will be over a longer period of time with greater movements accomplished. Thus, I have provided an appliance capable of moving the teeth into correct dental arch or position in an effective manner.

In the use of orthodontic appliances, orthodontists are endeavoring to move teeth from malpose to normal positions, and so cause the resorption and building of bone which, however, must be kept within physiological limits, or the destruction of bone and teeth may follow.

The present invention has for an object a device wherein by accurate control of tooth movement, resorption and building of bone is kept within physiological limits.

At the present time, many orthodontic appliances on the market offer weaknesses as to certain movements due to loss of anchorage. The present invention provides an orthodontic bracket whereby movement of a tooth may be controlled to a higher degree, with the conserving of anchorage, whereby there is an even flow of power without loss or interruption to the tooth without displacement of arch while engaging the bracket.

Other objects of the invention consist of an orthodontic appliance which is easy to use, efficient in operation, inexpensive in cost of manufacture, and generally superior to devices now known to the inventor.

With the above and other objects in view, the invention consists in the novel and useful provision, formation, construction, association, and relative arrangement of parts, members and features, all as depicted in certain embodiments in the accompanying drawing, described generally, and more particularly pointed out by the claims.

In the drawing:

Figure 1 is a perspective view of one form of my improved invention showing a bracket upon a band, Figure 2 is a fragmentary perspective view on an enlarged scale of the bracket and band shown in Figure 1, Figure 3 is a view similar to Figure 2, with an arch bar received within the groove of the bracket and a ligature engaging the bracket, Figure 4 is a view similar to Figure 3, the ligature having end portions thereof twisted together for the purpose of holding the arch bar within the groove of the bracket, Figure 5 is a fragmentary enlarged sectional view on the line 5—5 of Figure 2, Figure 6 is a fragmentary transverse sectional view of a slightly modified form of bracket from that of Figure 5, Figure 7 is a sectional view on the line 7—7 of Figure 6, Figure 8 is a transverse sectional view on the line 8—8 of Figure 4, Figure 9 is a sectional view on the line 9—9 of Figure 2, Figure 10 is a further modified form of the bracket, and, Figure 11 is the labial aspect of the bracket shown attached to the band in Figure 10.

Referring now with particularity to the drawing, I have shown in Figures 1, 2, 3, 4, 5, 8 and 9, one form of orthodontic appliance which is designated as an entirety by $a$. A second form is designated as an entirety by $b$ and shown in Figures 6 and 7, and a third form of the appliance designated by $c$ is shown in Figures 10 and 11.

That form of the invention designated by $a$ includes a bracket 2 which may be mounted upon a band 3. This band is adapted to encircle the body of a tooth, with the said band clamped about the tooth in any convenient manner, such as by crimping together ends of the band, as indicated by dotted lines in Figure 1 at 4.

The bracket 2 may constitute a block of metal, the lingual aspect of which may be flattened so that this aspect which constitutes the rear face of the base may be readily secured to the band 3 in any approved manner, such as by soldering, brazing, or the like. The labial aspect of the bracket presents an arch bar receiving slot 5, positioned substantially transversely of the block, the construction being such as to provide two walls 6 and 7. The surface of said walls bounding the slot are straight sided and substantially parallel. The base of the slot is substantially at right angles to the wall surfaces bounding the slot. The outer surface of the wall 6 may be curvedly chamfered forwardly of the bracket, as indicated at 8. In the embodiment shown, the wall 7 extends outwardly a greater amount from the base of the bracket than does the wall 6, see Figure 5. The wall 7 is flanged or formed with wings, as indicated in Figure 9 at 9 and 10, the flange extending beyond the marginal sides of the wall with the front face thereof chamfered or beveled. The inclination is forwardly. This chambered surface is designated as 11. Opposite sides of the wall 7 adjacent the flanges are provided with ligature wire grooves 12 and 13. These grooves are parallel or substantially so, to the chamfered or beveled surface 11. The outer face of the wall 7 is provided with a transverse ligature groove 14, said groove communicating with the grooves 12 and 13. Viewing Figure 5, it is to be observed that the grooves 12 and 13 intersect the inner surface of the wall 7 at a zone which corresponds to the depth of the groove 5 at the inner face of the wall 6. In other words this zone is a distance from the bottom of the groove 5 corresponding to the height of the wall 6. Thus, when the arch bar 100, which is adapted to fit with close tolerance within the groove 5, is actually positioned within said groove, as shown in Figure 8, the outward face of said arch bar has the portion at 15 at the zone of the inner edge of grooves 12 and 13.

The grooves 12, 13 and 14 receive therein a ligature 16, which is formed of wire. This wire, as indicated in Figure 3, assumes a U or staple shape, and the ends thereof may be twisted together, as indicated in Figure 4 at 17. This construction provides what may be termed a walled box in that the arch bar is firmly held within the bracket groove on four sides thereof. The twisted end of the ligature wire, together with the portions which overlie the inner surface of the wall 7 and bear against the arch bar 100, provides a pillar or post for the labial surface of the arch bar and effectively presents the arch bar from being displaced from the slot 5 of the bracket.

The wall 6 is curved so as to effectively do away with any sharp edge likely to abrade the lips, and the surface 11 is beveled to eliminate interference with teeth, especially in close over-bite cases. In addition to the reasons just stated, a saving of metal is effected. The wall 7, of greater depth than the wall 6, is so constructed that when a substantially rectangular arch bar, as shown at 100, is confined within the rectangular slot or groove 5, a surface is provided upon which the twisted ends of the ligature wire may rest, as shown in Figures 4 and 8, which effectively prevents any outward play of the arch bar from the slot and likewise prevents the ligature wire, in case of any stretch, from moving over the end of the wall 7. The wings 9 and 10 in Figure 9 are greatly exaggerated as to size. In actual practice, the grooves 12 and 13 may be relatively deep, in which event the size of the wings is reduced and in fact, the wings may be substantially the width of the wall 7. The wings prevent the ligature wire from displacement from the wall 7.

The form of the invention designated as b, and shown in Figures 6 and 7, includes a block 20, the lingual aspect of which may be secured to a tooth band 21, this said block being provided in its labial aspect with a groove 22 adapted to receive the arch bar of say the type shown at 100; the walls 23 and 24 bounding the groove 22 are of different heights at right angles to the groove base, the wall 24 being of greater height than the wall 23. The wall 23 on its outer surface is curvedly chamfered forwardly at 25, and chamfered or beveled at 26. The bevel 26 is inclined upwardly with respect to the surface 27 of the wall 20 bounding the groove 22. The wall 24 is provided on its sides with grooves 28 and 29 which are inclined upwardly and outwardly relative to the surface 30 of said wall. The surface 30 of the wall 24 is formed with a transverse groove 31 communicating with the grooves 28 and 29. This wall 24 is provided with a beveled front face 32 which is inclined upwardly and forwardly with relation to the surface 30. This bracket construction, it will be noted, differs from that form indicated by a in that the wall is not flanged or provided with wings. As before, the ligature wire will be received within the slots 28, 29 and 31, with ends of said wire twisted for holding the arch bar within the slot 22. The beveled surface 26 allows ready entrance of the arch bar within the slot 22.

The form of the invention indicated by c and shown in Figures 10 and 11, constitutes what I am pleased to term an offset bracket. This particular form of bracket embodies the principles taught by the forms a and b with the exception that the walls are in offset relationship. This particular form of bracket has proved to be of great use in the obtaining of certain tooth movement, in that the offset bracket permits the greatest possible freedom in the tipping of the tooth. Furthermore, the offset bracket gives about twice the leverage contact with the arch bar. Thus, there is a greater ease in manipulating the tooth. This greater ease of manipulation also contemplates that the force applied to move the tooth will be utilized for a greater period of time, thus giving more physiological force, greater precision in tooth movement, and resultant comfort to the patient.

The offset bracket construction includes a base 40 and a pair of walls 41 and 42, each of substantial size and approximately equal length the walls forming together with the base 40, a groove for the reception of an arch bar such as indicated at 100. The wall 41 may have its side wall surface 43 substantially parallel with the proximate side wall surface 44 of wall 42, and in alignment therewith. This alignment is not absolutely necessary but has been found useful in practicing this form of the invention. By substantial size it is meant that the bar engaging faces of the walls 41 and 42 engage the arch bar side edges an appreciable distance lengthwise of the arch bar, said distance being the length of each wall from the side wall surfaces 43 and 44 as clearly shown in Figures 10 and 11. The equal length of the walls 41 and 42 equalizes the balance of the offset bracket. The wall 43 is of a form corresponding to that shown by the invention designated as a in that the outer surface thereof may be curvedly chamfered forwardly as indicated at 45. The wall 42 is of the form of the invention designated as b in Figure 6, although this wall may be provided with a flange or wings corresponding to the wall 7 of the form a. The wall 42 extends to a greater height above the base of the bracket than does the wall 41 and said wall, along its transverse sides, is provided with grooves 46 and 47, which grooves merge with an interconnecting transverse groove on the outer face of said wall. A ligature wire secures the arch bar, which arch bar is indicated in Figure 10 by the dotted lines 48, in the usual manner, to wit, by twisting the ends of said ligature wire against the arch bar. It is evident that this offset bracket construction allows the arch bar to exert great leverage thereon and to thereby produce positive tooth movement.

This offset bracket permits motions of the teeth both labially, lingually, buccally, laterally, or combinations of any of said motions.

Furthermore, the method of securing the ligature wire to the bracket is such that rotation of the arch bar within the bracket slot is effectively overcome. When several teeth are to be moved in any direction, the bracket construction plus the method of holding the arch bar thereto, is such that there is less loss of anchorage due to the firmness with which the arch bar engages the various brackets. In fact, the method of locking the arch bar within the bracket is such that in order to dislodge the arch bar, the ligature wire would have to be sheared.

In a device of this character, it is to be appreciated that the orthodontist may easily lock the arch bar within the bracket slot, due to the fact that all work to be performed in attaching the ligature is labially of the bracket, and furthermore, this ligature wire is secured to one bracket wall. Thus, the necessity of passing the ligature over the arch bar and around a further wall of the bracket is unnecessary.

The present constructions of the orthodontic brackets are such as to present the least objection when viewed by the patient or others. Patients oftentimes are quite sensitive during any straightening work upon the teeth, due to the fact that the appliances are unsightly in appearance. The present bracket construction is such that the appearance thereof is not unsightly.

I claim:

1. An orthodontic appliance comprising a tooth band bracket provided with two spaced walls of unequal depth defining a groove to receive an arch-bar corresponding to the width of the groove and the height of the wall of lesser depth, and the wall of greater depth provided with parallel grooves in the sides thereof intersecting with the arch-bar receiving groove a distance from the bottom of the groove corresponding to the height of the wall of lesser depth.

2. An orthodontic appliance comprising a tooth band bracket provided with two spaced walls of unequal depth defining a groove to receive an arch-bar corrsponding to the width of the groove and the height of the wall of lesser depth, the wall of greater depth provided with parallel grooves in the sides thereof intersecting with the arch-bar receiving groove a distance from the bottom of the groove corresponding to the height of the wall of lesser depth and on its outer face with a groove interconnecting the parallel side grooves.

3. An orthodontic appliance comprising a tooth band bracket provided with two spaced walls of unequal depth defining a groove to receive an arch-bar corresponding to the width of the groove and the height of the wall of lesser depth, the wall of greater depth provided with parallel grooves in the sides thereof intersecting with the arch-bar receiving groove a distance from the bottom of the groove corresponding to the height of the wall of lesser depth, and on its outer face with a groove interconnecting the parallel side grooves, and wings extending away from the sides and outer face of said wall of greater depth at the marginal edges thereof and adjacent to the grooves whereby a ligature wire may be more securely retained in said parallel and interconnecting grooves.

4. In an orthodontic appliance, the combination with an arch bar of a tooth-band bracket, provided with two spaced walls defining therebetween an arch bar receiving groove, one of said walls being of greater height above the groove base than the other thereof and the wall of greater height provided with a pair of parallel grooves inclined forwardly with respect to the base of the arch bar groove and intersecting with the arch bar receiving groove, and an arch bar within the arch bar receiving groove whereby when the arch bar is within the arch bar receiving groove, the lower edge of the front face of said arch bar is at the zone of intersection of said parallel grooves with the arch-bar groove.

5. In an orthodontic appliance, the combination with an arch bar of a tooth-band bracket, provided with two spaced walls defining therebetween an arch bar groove, one of said walls being of greater height above the groove base than the other thereof, and the wall of greater height provided with a pair of parallel grooves inclined forwardly with respect to the base of the arch bar groove and intersecting with the arch bar groove at a zone corresponding to the depth of the arch bar groove relative to the wall of lesser height, and an arch bar within the arch bar receiving groove whereby when the arch bar is within the arch bar groove, the lower edge of the front face of said arch bar is at said zone of intersection of said parallel grooves with the arch-bar groove, said parallel grooves adapted to receive a ligature wire, the ends of which are to be twisted together for engagement with the arch bar and with the surface of the wall of greater height outwardly from the parallel grooves for maintaining said arch bar within said arch bar groove.

6. An orthodontic appliance comprising a tooth band bracket provided with a pair of spaced end walls having side surfaces, each wall of substantial length and different heights defining therebetween an arch bar receiving groove, said end walls being in parallel offset relationship with the proximate side surfaces substantially in a single plane transverse to the longitudinal axis of the groove, and means on the wall of greater height whereby a ligature wire may be secured thereto for maintaining an arch bar within said groove.

7. An orthodontic appliance comprising a one piece tooth band bracket having a base and a pair of parallel offset walls having side surfaces, said walls defining therebetween an arch bar receiving groove with the proximate side surfaces in a single plane transverse to the longitudinal axis of the groove on the labial aspect of said base, said walls being of substantial size and of approximately equal length, and said base extending the combined lengths of the offset walls.

CHARLES EDWARD BOYD.